Figure 1:
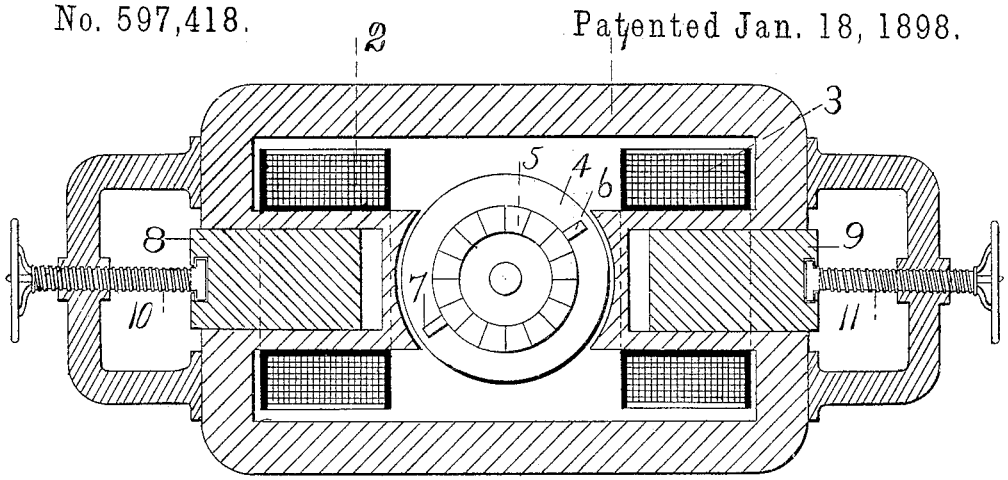

(No Model.)  F. A. JOHNSON.  2 Sheets—Sheet 1.
REGULATION OF DYNAMO ELECTRIC MACHINERY.
No. 597,418.  Patented Jan. 18, 1898.

Witnesses
H. W. Thayer
A. E. Hansmann

Inventor
Frederic A. Johnson
by
Attorneys (No Model.)  2 Sheets—Sheet 2.

F. A. JOHNSON.
REGULATION OF DYNAMO ELECTRIC MACHINERY.

No. 597,418. Patented Jan. 18, 1898.

Witnesses
H. W. Thayer.
A. E. Hansmann.

Inventor
Frederic A. Johnson
by Foster Freeman
Attorneys

UNITED STATES PATENT OFFICE.

FREDERIC AYRES JOHNSON, OF BINGHAMTON, NEW YORK.

REGULATION OF DYNAMO-ELECTRIC MACHINERY.

SPECIFICATION forming part of Letters Patent No. 597,418, dated January 18, 1898.

Application filed April 14, 1897. Serial No. 632,158. (No model.)

*To all whom it may concern:*

Be it known that I, FREDERIC AYRES JOHNSON, a citizen of the United States, residing at Binghamton, Broome county, State of New York, have invented certain new and useful Improvements in Dynamo-Electric Machinery, of which the following is a specification.

My invention relates to the regulation of dynamo-electric machines, and comprises a new and useful method of and apparatus for effecting such regulation. It is particularly designed for electric motors and will be described with reference thereto; but the same principles are equally applicable to electric generators whose voltage is to be varied within wide limits.

When an electric motor is to be run on a constant-potential circuit, it is well known that efficient speed regulation is exceedingly difficult. In practice it is very common to use two or more small motors instead of one large one and to control them by the series-parallel method. This system gives fairly good results, but greatly increases the first cost and weight of the installation. It is also common to insert variable resistances in series with the armature; but this is obviously an exceedingly wasteful practice. It has also been proposed to secure the required speed regulation by weakening the field-magnets; but in commercial work this has been found out of the question, except within a narrow range of speed, for the reason that if the field is weakened the neutral line shifts and the motor sparks excessively, unless the brushes are also shifted. If this weakening of the field is carried beyond a certain limit, it may happen that there is no point at which the brushes may be set in order that the motor may run without sparking on account of the great distorting effect of the armature reaction upon the comparatively weak field. When the machine is to be used as a generator producing different voltages, the same difficulties occur. In order to avoid sparking, it is necessary that at the instant of commutation the short-circuited coil be passing through a field of such strength that when it passes out from under the brush and is placed in its new relation on the other side of the armature-circuit it shall be the seat of a current practically equal to the current which it must carry in the new relation. In practice a stiff field is provided, and the brushes are so set that commutation takes place on the edge of this field.

I am able to secure the proper commutation-field at all strengths and at the same time to permit wide variations in the total flux through the armature by my improved method and apparatus.

Particular embodiments of my invention are illustrated in the accompanying drawings, in which—

Figure 1 is a view, partly in section, of a machine constructed according to my invention, in which the regulation is effected by varying the reluctance of a portion of the magnetic circuit. Figs. 2 to 5 are views of machines in which the regulation is effected by varying the magnetomotive force acting upon a portion of the magnetic circuit.

In Fig. 1 is shown a motor consisting of the field-magnet 1, excited by coils 2 3, and the armature 4, with commutator 5 and brushes 6 7. The armature may be of any preferred type and is illustrated in diagram only. The pole-pieces are hollow and the cavities are fitted with the soft-iron masses 8 9, whose position may be adjusted by the screws 10 11. If these masses are forced as far as possible into the poles of the field-magnet, the flux through the armature will be a maximum and the motor will run at its lowest speed. If, however, these masses are wholly or partially removed from the cavities in which they slide, the flux through the center of each pole-piece will be greatly reduced and the speed of the motor will be increased; but the flux through the polar tips will not be reduced, but will, on the contrary, tend to be strengthened. The commutated coils, therefore, are still in a stiff field and the motor does not spark; but as the total flux through the armature is reduced the total counter electromotive force of the motor is also reduced and the speed rises.

Figure 2:
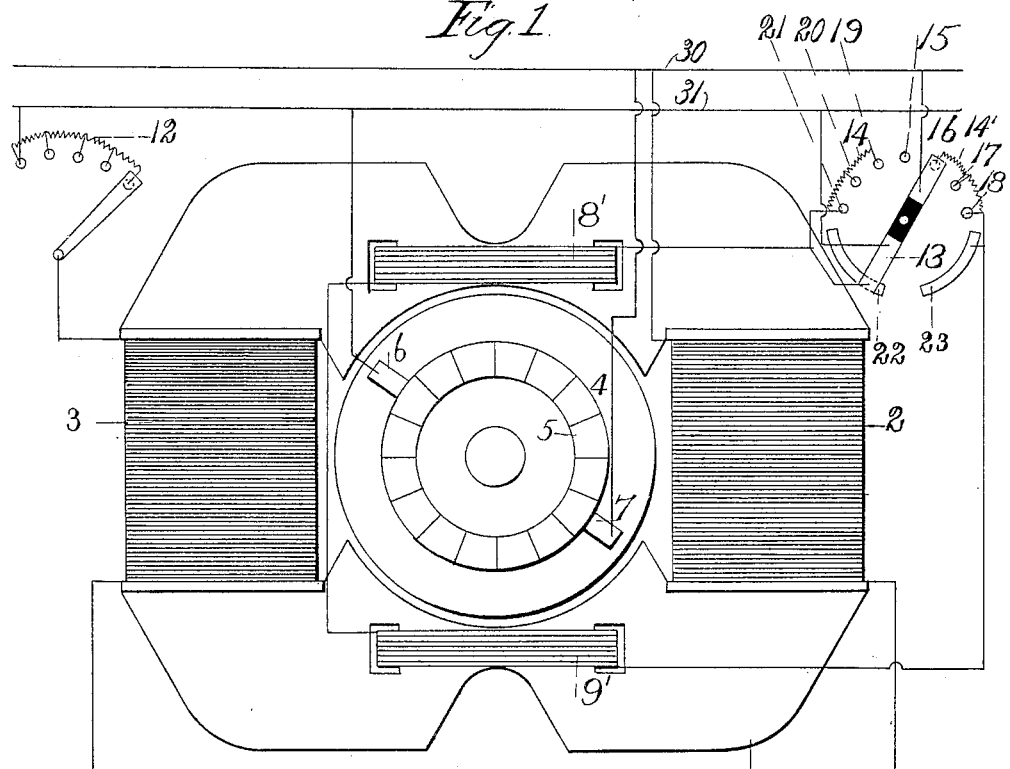

Fig. 2 shows another form in which a similar result is accomplished by purely electrical means. In this figure 1 is the field-magnet of a common consequent pole-type, with main exciting-coils 2 3, as before, and 4 is the armature, with the commutator 5 and brushes 6 7. The brushes are in multiple with the mains 30 31, and the main field-coils are connected in multiple with the same mains through the adjustable resistance 12. Wound in slots in the field-magnet structure are auxiliary field-coils 8' 9', connected in multiple with the mains through the reversing-switch 13 and adjustable resistances 14 14', as shown. It will be seen that these coils are so wound as to send lines of force through the center of the pole-pieces only and that their effect upon the polar tips is small. With the switch 13 on the point 15 these coils are cut out and have no effect upon the action of the motor. If now the switch 13 be moved to the point 16, as shown, the current will pass from the mains through the switch, through resistance 14' to the coils 8' and 9', segment 22, switch 13 to main 31, magnetizing the coils 8' 9' in such a way that the flux in the center of each pole-piece is increased without seriously affecting the flux through the polar tips. The speed of the motor will therefore fall. As the switch is moved to the point 17 and 18 the resistance 14' is cut out and the total flux through the armature of the motor is still further increased; but the commutated coils are in practically the same field as before and the motor does not spark. If, on the other hand, the switch 13 be moved to the contacts 19 and 23, the current in the coils 8' and 9' is reversed and the field at the center of each polar projection is weakened. As the switch passes to the points 20 21 the effect becomes still more pronounced; but as the flux through the polar tips is not weakened the neutral line is not shifted and the motor still runs sparklessly. By properly adjusting the resistances 12, 14, and 14' it is possible to secure any desired speed within wide limits and at the same time to maintain the commutated coils in such a field that the motor shall still be quite sparkless.

Figure 3:
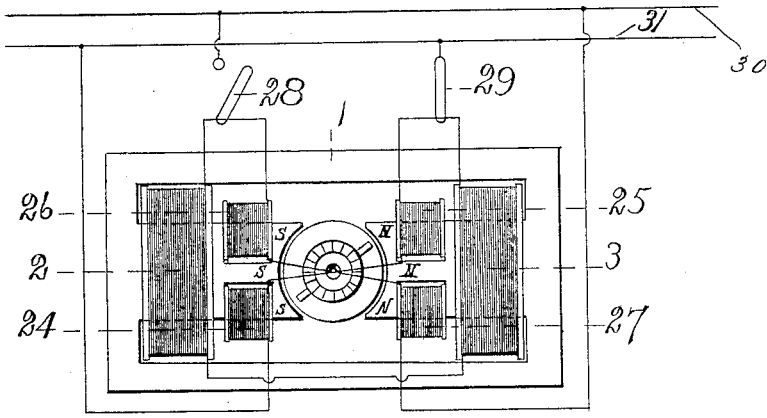

Fig. 3 shows a slightly-different arrangement. The main field-coils 2 and 3 are connected in series with the auxiliary coils 24 25 26 27 and with shunting-switches 28 29, whose action will be described below. The relative directions of the windings are indicated by the N S marks upon the poles. It will be seen that the effect of the coils 24 25 26 27 is to strengthen the poles at the tips without greatly affecting the strength of the poles at the centers of the polar extensions. At the same time the resistance of these coils is such as to materially cut down the current in the main field-coils. If, however, both of the switches are closed, the main field-coils are connected directly across the mains and the auxiliary coils are deënergized. The field excitation is then a maximum; but if the switch 28 be opened, as shown, the auxiliary coils 26 27 will be connected in series with the main field-coils 2 and 3, and the result will be to reduce the current in the main coils and to weaken the field of the motor; but the coils 26 27 produce additional magnetomotive forces acting upon those coils of the armature which are undergoing commutation and a stiff commutating-field is provided. The total flux through the armature is, however, greatly reduced both by the weakening of the exciting-current of the coils 2 3 and also by the tendency of the lines of force flowing from the polar tips on which the coils 26 27 are wound to return through the centers and opposite tips of the same pole-pieces, neutralizing at those points partially or wholly the flux due to 2 3. The shunting-switches 28 29 may, if preferred, be replaced with variable resistances to give a larger number of changes of speed. If the motor is run in the opposite direction, the switch 28 may be opened when an increase of speed is desired, which will strengthen the field at the polar tips on which the coils 26 27 are wound and weaken the field at all other points.

Figure 4:
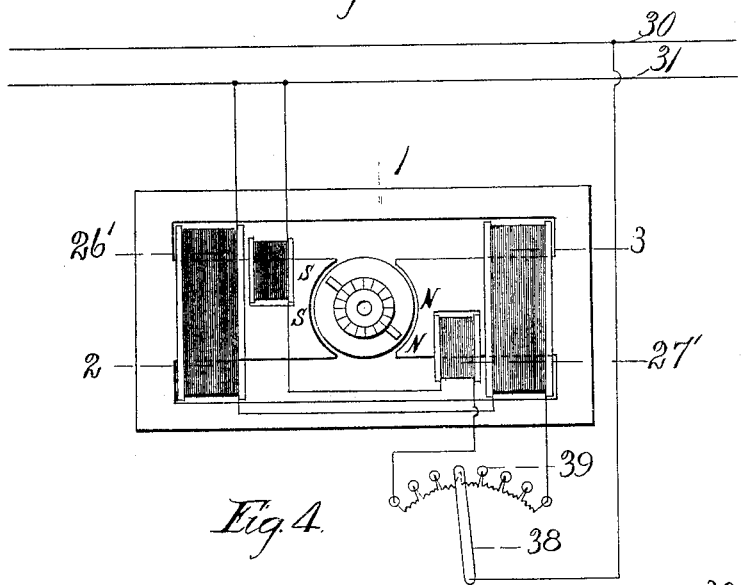

Fig. 4 shows a motor of a similar structure arranged to run in one direction only. The coils 26' 27' are in this case also wound so as to strengthen the field on those tips on which they are placed and are connected in multiple with the line through the switch 38 and resistance 39. The main field-coils 2 3 are also connected in multiple with the line through the same resistance, and the connections are so made that as the switch-arm 38 is moved it cuts resistance out of one of the branch circuits and into the other. When the arm is thrown to the right, the result will be to cut out the resistance in series with 2 3 and to place all of the resistance in series with 26' 27'. The main field-coils will then exert a very powerful magnetizing effect and the auxiliary coils will be partially deënergized. This position corresponds to the slowest speed. If now the switch-arm 28 be moved to the left, the current in the main field-coils will be gradually reduced and the flux through the armature weakened; but at the same time the current in 26' 27' is increased and the flux through the commutated coils maintained or even increased, according to the proportions of the various coils. It will be obvious that with this arrangement I am enabled to run a motor sparklessly at a number of different speeds, but in one direction only.

Figure 5:
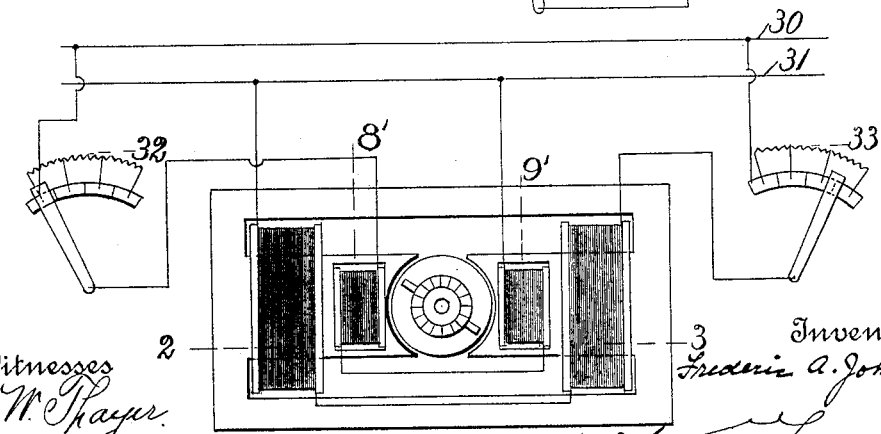

In Fig. 5 I have shown an arrangement very similar to that shown in Fig. 2. The auxiliary coils 8' 9' are wound to oppose the flux produced by the main coils 2 3 at the centers of the polar faces, while at the tips they tend to strengthen the original field. Adjustable resistances 32 33 are inserted in series with the auxiliary coils and with the main field-coils, respectively.

It is obvious that the principles above set forth may be applied to motors of various types and that various changes may be made without departing from the spirit of my invention.

I therefore claim as my invention and desire to secure by Letters Patent—

1. The method of producing and varying the magnetic flux in a dynamo-electric machine, which consists in creating a magnetomotive force in a magnetic circuit composed, at one or more points, of several branches, generating, in one or more of said branches, a second magnetomotive force, and varying said second magnetomotive force at will to vary the total flux through the machine, while maintaining a strong flux through those branches of the magnetic circuit which furnish the field for the coils under commutation.

2. The method of regulating the speed of an electric motor, which consists in varying the total flux through the armature at will within wide limits, to vary the speed of the motor, and maintaining at all speeds a strong field at those portions of the pole-pieces under which the commutation takes place, substantially as described.

3. The method of varying the speed of an electric motor, which consists in varying the total flux through the armature at will within wide limits, to vary the speed of the motor, and maintaining at all speeds a strong and approximately constant field at those portions of the pole-pieces under which the commutation takes place, substantially as described.

4. In an electric motor, the combination with the field-magnets and armature, of means for adjusting and varying at will the magnetic flux passing through a portion of each or any pole-piece, without greatly affecting the quantity passing through the portion of the pole-piece furnishing the field for the coils under commutation.

5. In an electric motor, in combination with the armature and field-magnet, a switch for increasing the flux passing through one tip of one of the pole-pieces, and for at the same time diminishing the flux through the center of the pole-pieces, to vary the speed of the motor without causing sparking.

6. In an electric motor, the combination of a field-magnet and armature, main field-magnet windings, an auxiliary field-magnet winding wound in a slot in one or more of the pole-pieces, in such a way as to embrace only a portion thereof, and a switch for varying the current in the auxiliary winding, substantially as described.

7. In an electric motor, the combination of a field-magnet and armature, main field-magnet windings, an auxiliary field-magnet winding surrounding a part only of one or more of the pole-pieces, and a switch for varying and reversing the current in the auxiliary winding, substantially as described.

8. In an electric motor, the combination of a field-magnet, an armature, main field-magnet windings, auxiliary field-magnet windings, and a switch adapted to strengthen the field acting upon the coils under commutation and at the same time to weaken the total flux through the armature.

9. In an electric motor, the combination of a field-magnet, an armature, main field-magnet windings, auxiliary field-magnet windings, and a switch and a resistance adapted to gradually strengthen the field acting upon the coils under commutation and at the same time to weaken the total flux through the armature, substantially as described.

In testimony whereof I have signed my name to this specification in the presence of two subscribing witnesses.

FREDERIC AYRES JOHNSON.

Witnesses:
J. M. JOHNSON,
HOWARD SUPPLE.